April 21, 1959   O. LANG   2,882,770
TIRE CHAIN APPLYING TOOL
Filed Aug. 6, 1956
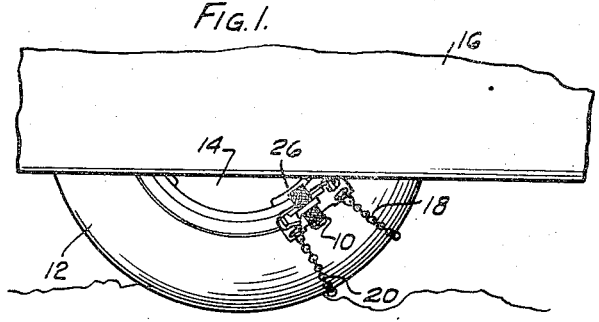
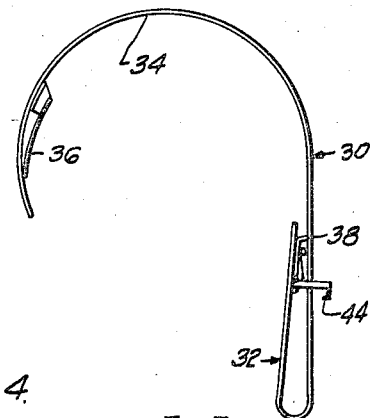
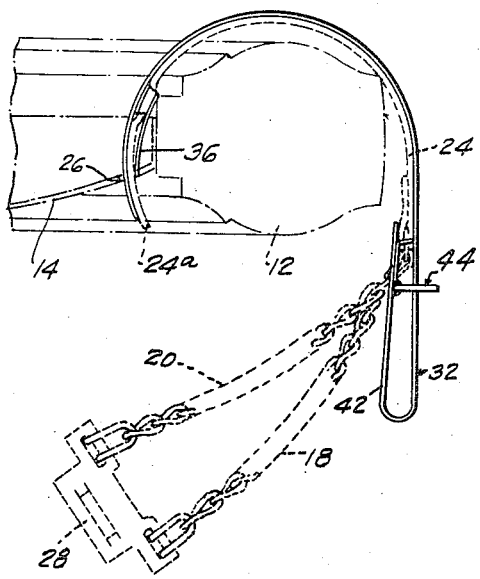
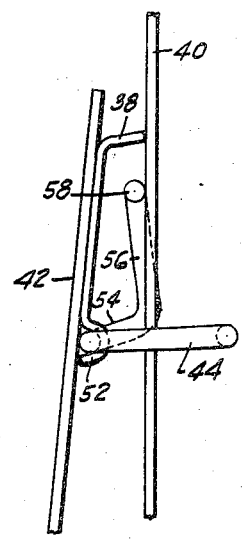
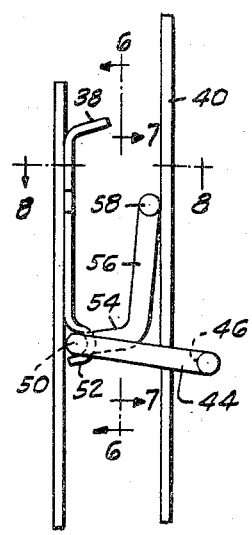
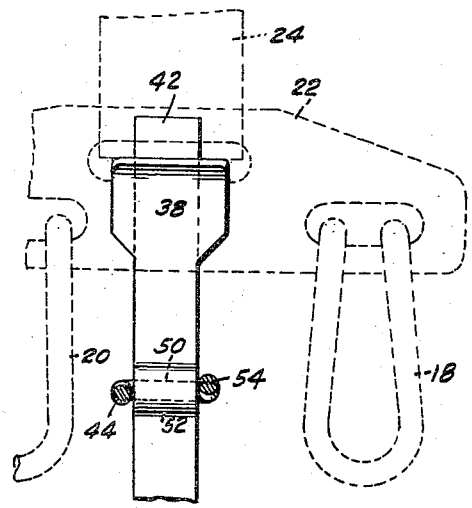
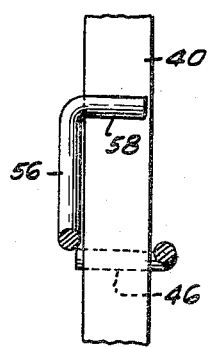
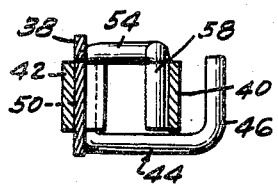
INVENTOR.
OTTO LANG
BY Harry H. Hitzeman
ATTORNEY.

United States Patent Office 2,882,770
Patented Apr. 21, 1959

2,882,770

TIRE CHAIN APPLYING TOOL

Otto Lang, Chicago, Ill.

Application August 6, 1956, Serial No. 602,360

2 Claims. (Cl. 81—15.8)

My invention relates to improvements in a tool for applying emergency chains to automobile tires.

Emergency chains of the type to which I refer usually consist of a length of double chain for wrapping around the tire crosswise and a fastening strap and buckle for holding the chain tightly about the automobile tire. It is frequently necessary to apply these chains on the road and when the tires are muddy and wet. In applying the same, it is necessary to place the fastening strap around the inside of the tire and back through the wheel, and in so doing the hands and clothing of the person handling the same frequently become soiled during this action.

The principal object of the present invention is to provide a tool in the form of a long bowed or arcuate member which may grasp the bracket at one end of the chain and the fastening strap and direct the same about the inside of the tire and out again to the outside so that the strap may be grasped and easily fastened to the buckle at the other end of the tire chain.

A further object of the invention is to make a device of the type described that is capable of easy operation and sufficiently simple to operate so that any driver of an automobile can apply an emergency chain to the automobile tire with the use of this tool when the necessity arises.

A further object of the invention is to provide a tool of the type described that is capable of comparatively simple manufacture, being constructed of a minimum of parts and so arranged that in use the same cannot easily become damaged or broken.

A further object of the invention is to provide a tool of the type described which is capable of easy engagement with the fastening strap of an emergency chain for manipulating the strap through the wheel of an automotive vehicle, and is also easily and simply disengageable after the strap has been passed around the tire for fastening.

Other objects and advantages will be more apparent from the following description wherein reference is had to the accompanying drawings, upon which, Fig. 1 is a fragmentary side view of an automobile tire and wheel to which an emergenecy chain has been fastened;

Fig. 2 is a side elevational view of the chain applying tool;

Fig. 3 is a similar side elevational view thereof showing the same grasping the connecting link at one end of an emergency tire chair, the other end of the tool grasping the extended end of the fastening strap of the chain;

Fig. 4 is a full size fragmentary view of the portion of the tool handle including the jaw for grasping the connecting link of the emergency chain;

Fig. 5 is a similar view thereof with the parts shown in a changed position or with the jaw open;

Fig. 6 is a transverse sectional view taken on the line 6—6 of Fig. 5, showing the manner in which the tool and jaw portion grasp the connecting link of an emegency chain, the same being shown in the view in dotted lines;

Fig. 7 is a sectional view of portions of the jaw handle, the view being taken on the line 7—7 of Fig. 5; and Fig. 8 is a sectional view taken on line 8—8 of Fig. 5.

In the embodiment of the invention which I have chosen to illustrate and describe the same, I have shown the usual emergency chain 10 attached to the tire 12 of the wheel 14 of an automotive vehicle 16. The emergency tire chain of this type usually consists of a pair of chain members 18 and 20 connected at one end by a link 22 that has a flexible strap 24 extending therefrom, the strap 24 being adapted to be passed around the tire and through the usual arcuate slot 26 in the wheel 14 of the vehicle and then fastened to a buckle 28 at the other end of the emergency chain.

For passing the flexible strap 24 around the tire 12 and through the slot 26 in the wheel 14, I have provided a device which may consist of a flat spring steel strap member 30 formed at one end with a U-shaped handle portion 32 terminating in a generally semi-cylindrical extension 34. I provide a spring plate 36 attached adjacent the extended end of the semi-cylindrical portion 34 thereof, the same capable of holding the extended end 24a of the flexible strap for passing the same through the slot 26 of the wheel 14 as shown.

The connecting link 22 of the tire chain is adapted to be grasped by a jaw member 38 adjacent the open end of the handle portion 32 of the tool with the fastening strap positioned against the inner periphery of the circular portion 34 of the tool, with the end frictionally held near the open end of the tool by the spring clip member 36 as hereinbefore described.

The strap member 30 being made of spring steel, the handle portion 32 tends to press the jaw 38 against the outer wall portion 40 of the handle, the jaw 38 being fastened by welding or otherwise to the inner portion 42 of the handle 32.

Means for spreading the two walls of the handle to release the grasp of the jaw on the connecting link may include a comparatively heavy wire member 44 which has a finger portion 46 extending parallel to the wall 40 of the handle, a transverse portion and a portion 50 journalled in an arcuate groove 52 formed in the lower end of the jaw member 38, and a portion 54 extending forwardly, a portion 56 extending upwardly, and a transverse bend 58 which lies against the inside of the wall 40. The finger operated member 44, when moved downwardly by the thumb of the operator, thus tends to spread the walls 40 and 42 of the handle, moving the jaw 38 away from the wall 40 to permit the grasping or loosening of a grasp on the connecting link 22 as desired.

From the foregoing description it can thus be seen that I have provided a comparatively simple applying tool, one that may be constructed of a comparatively narrow strip of spring metal so that it can apply the strap of an emergency chain about tires of various sizes. In addition, due to the use of spring steel in the formation of the tool and handle portion, the positioning of the jaw in the handle portion provides a frictional grasp on a connecting link; also the finger operated unit 44 is easily manipulated to release or open the jaw to receive or relinquish its hold on a connecting link.

I contemplate that changes and modifications may be made in the exact details shown and I do not wish to be limited in any particular; rather what I desire to secure and protect by Letters Patent of the United States is:

1. A tool for applying emergency tire chains of the type comprising dual chains connected at one end by a link and at the other end by a buckle and provided with a flexible fastening strap attached to said link and capable of fastening around a tire to said buckle, said tool comprising a flat spring steel strap member formed with a leg bent back against the back of the end of said strap member to form a handle, a generally semi-cylindrical extension from said handle, a spring clip fastened adjacent the end of said extension for receiving and retaining the end of the flexible strap of said tire chains and a jaw associated with said handle for grasping the connecting link of said tire chains to extend said strap around an automobile tire, said handle having a thumb-operated lever for moving said jaw to release it from the connecting link, said jaw being a flat metal strap fastened inside the leg of the handle, having its end bent at an angle and yieldingly held against the connecting link.

2. A tool for applying emergency tire chains of the type comprising dual chains connected at one end by a link and at the other end by a buckle and provided with a flexible fastening strap attached to said link and capable of fastening around a tire to said buckle, said tool comprising a flat spring steel strap member formed with a leg bent back against the back of the end of said strap member to form a handle, a generally semi-cylindrical extension from said handle, a spring clip fastened adjacent the end of said extension for receiving and retaining the end of the flexible strap of said tire chains and a jaw associated with said handle for grasping the connecting link of said tire chains to extend said strap around an automobile tire, said handle having a thumb-operated lever for moving said jaw to release it from the connecting link, said jaw being a flat metal strap fastened inside the leg of the handle, having one end bent at an angle and yieldingly held against the connecting link, said metal strap having a socket at its opposite end serving as a journal for said thumb operated lever, said lever having bent portions located between the legs of the handle and a finger portion aligned with said handle for manipulation to expand the legs of the handle to receive the connecting link of the tire chain.

References Cited in the file of this patent
UNITED STATES PATENTS

| | | |
|---|---|---|
| 1,726,624 | Lawson | Sept. 3, 1929 |
| 2,135,403 | Lewis | Nov. 1, 1938 |
| 2,212,267 | Hudson | Aug. 20, 1940 |